(12) United States Patent
Knezevic et al.

(10) Patent No.: US 10,883,559 B2
(45) Date of Patent: Jan. 5, 2021

(54) DAMPING VALVE FOR A VIBRATION DAMPER

(71) Applicant: ZF FRIEDRICHSHAFEN AG, Friedrichshafen (DE)

(72) Inventors: Aleksandar Knezevic, Eitorf (DE); Jörg Rösseler, Ruppichteroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 21 days.

(21) Appl. No.: 16/336,044

(22) PCT Filed: Aug. 11, 2017

(86) PCT No.: PCT/EP2017/070416
§ 371 (c)(1),
(2) Date: Mar. 22, 2019

(87) PCT Pub. No.: WO2018/054600
PCT Pub. Date: Mar. 29, 2018

(65) Prior Publication Data
US 2019/0219124 A1 Jul. 18, 2019

(30) Foreign Application Priority Data
Sep. 23, 2016 (DE) .................. 10 2016 218 376

(51) Int. Cl.
*F16F 9/348* (2006.01)
(52) U.S. Cl.
CPC ................. *F16F 9/3485* (2013.01)
(58) Field of Classification Search
CPC ........ F16F 9/348; F16F 9/3415; F16F 9/3484; F16F 9/3485; F16F 2224/025; F16F 2230/00; F16F 9/3214; F16F 9/3405; F16K 15/023; F16K 17/0433; F16K 47/023
USPC ....................................... 188/282.5
See application file for complete search history.

(56) References Cited

U.S. PATENT DOCUMENTS

| | | | | |
|---|---|---|---|---|
| 3,621,951 A | * | 11/1971 | Schmid | F16F 9/348 188/282.5 |
| 4,653,617 A | | 3/1987 | Casimir et al. | |
| 5,018,608 A | * | 5/1991 | Imaizumi | F16F 9/50 188/282.5 |

(Continued)

FOREIGN PATENT DOCUMENTS

| | | |
|---|---|---|
| DE | 18 17 391 | 12/1968 |
| DE | 1817392 | 7/1970 |

(Continued)

*Primary Examiner* — Robert A. Siconolfi
*Assistant Examiner* — San M Aung
(74) *Attorney, Agent, or Firm* — Cozen O'Connor

(57) ABSTRACT

A damping valve for a vibration damper includes a damping valve body with at least one through-channel, the outlet side of which is at least partially covered by at least one valve disk. The at least one valve disk lifts from a valve seat surface when there is an incident flow via the through-channel, and a supporting disk, as stop, limits the lift movement. An elastomer intermediate layer is arranged between the supporting disk and the valve disk. The elastomer intermediate layer is formed by an elastomer ring which has at least one raised deformation area in direction of the valve disk and/or supporting disk.

10 Claims, 4 Drawing Sheets

(56) References Cited

U.S. PATENT DOCUMENTS

| | | | |
|---|---|---|---|
| 2012/0160624 A1* | 6/2012 | Katayama | F16F 9/468 188/314 |
| 2013/0074341 A1* | 3/2013 | Kitagawa | F16F 9/3484 29/890.12 |
| 2015/0152936 A1 | 6/2015 | Kim | |

FOREIGN PATENT DOCUMENTS

| | | |
|---|---|---|
| DE | 35 03 152 | 8/1986 |
| DE | 10 2006 031 179 | 12/2007 |
| DE | 10 2007 007 722 | 6/2008 |
| DE | 10 2015 206 022 | 10/2016 |
| EP | 1 600 662 | 11/2005 |

\* cited by examiner

DAMPING VALVE FOR A VIBRATION DAMPER

CROSS REFERENCE TO RELATED APPLICATIONS

This is a U.S. national stage of application No. PCT/EP2017/070416, filed on Aug. 11, 2017. Priority is claimed on German Application No. DE102016218376.1, filed Sep. 23, 2016, the content of which is incorporated herein by reference.

BACKGROUND OF THE INVENTION

1. Field of the Invention

The invention is directed to a damping valve.

2. Description of the Prior Art

A damping valve for a vibration damper comprises a damping valve body with at least one through-channel, an outlet side of which is at least partially covered by at least one valve disk. When there is an incident flow against the valve side via the through-channel, the valve disk lifts from a valve seat surface. Generally, to protect the valve disk against a mechanical overloading, at least one supporting disk is used as a stop that limits the lift movement. In the simplest construction, the supporting disk is constructed as a simple, generally metal annular disk. In contrast, the valve disk is elastically deformable within limits or is mounted so as to be axially moveable against a spring. Regardless of the embodiment form, the effect whereby the valve disk strikes the supporting disk occurs in damping operation during sudden peak loads. This impact is audible.

One solution is to use a plurality of valve disks in a layered arrangement. The layering brings about a supporting function within the stack of disks. A drawback consists in that an increase in the damping force characteristic occurs in valve disks, which tend to be rigid.

A damping valve for a vibration damper having an elastomer support constructed as an elastomer ring which opposes a stop movement of the valve disk against a supporting ring is known from the generic DE 18 17 392 B2.

SUMMARY OF THE INVENTION

An object of one aspect of the present invention is to further develop the generic damping valve with a view to improving the flow-off behavior.

The above-stated object is met in that an elastomer intermediate layer is formed by an elastomer ring, which has at least one raised deformation area in direction of the valve disk and/or supporting disk.

The great advantage of at least one aspect of the invention is that a plurality of individual deformation elements which, by themselves, present individual spring elements or supporting elements can be fitted in one work step by the elastomer ring.

To achieve a stepped spring characteristic, at least two raised deformation areas have different spring deflections.

The elastomer intermediate layer can be fastened to the supporting disk. This type of fastening has the advantage that the contact surface of the supporting disk is dimensionally stable and consequently the best prerequisite exists for an adhesive connection between the elastomer intermediate layer and the supporting disk.

Alternatively, the elastomer intermediate layer can also reasonably be fastened to the valve disk, e.g., when a particular rolling profile, which would be rather less suitable for an adhesive connection, exists at the supporting disk.

In order to prevent a hydraulic blockage inside of the elastomer intermediate layer, the elastomer intermediate layer has at least one radial flow-off channel. In principle, the flow-off channel could also be placed inside the supporting disk, but this would weaken the supporting disk.

In a further configuration, the flow-off channel is reinforced by at least one rigid sleeve. This prevents a closure of the flow-out channel as a result of the deformation of the elastomer intermediate layer.

The deformation areas with the largest elevation are optionally constructed as plane surfaces. This configuration offers the advantage that the elastomer intermediate layer can be fastened without orienting relative to an end face. Every deformation area can accordingly also be utilized as contact surface for the valve disk or for the supporting disk.

In order to steer the opening behavior of the valve disk selectively to a circumferential area, the elastomer intermediate layer has a nonuniform radius. The area of the outer diameter of the valve disk at the greatest radial distance from the elastomer intermediate layer will be the first to lift from the valve seat surface.

Alternatively, the elastomer intermediate layer can have a constant diameter, but the front faces of the deformation areas have a varying distance from the center axis of the valve disk.

In principle, it is also possible to arrange a plurality of elastomer intermediate layers coaxial to one another. A large number of operating characteristics of the elastomer intermediate layers can be generated by combining a plurality of elastomer intermediate layers.

Another option consists in forming deformation areas at the two front faces of the elastomer intermediate layer. In this way, the elastomer intermediate layer can be fixed by any front face.

BRIEF DESCRIPTION OF THE DRAWINGS

The invention will be described in more detail referring to the following description of the figures.

The drawings show.

DETAILED DESCRIPTION OF THE PRESENTLY PREFERRED EMBODIMENTS

Figure 1:
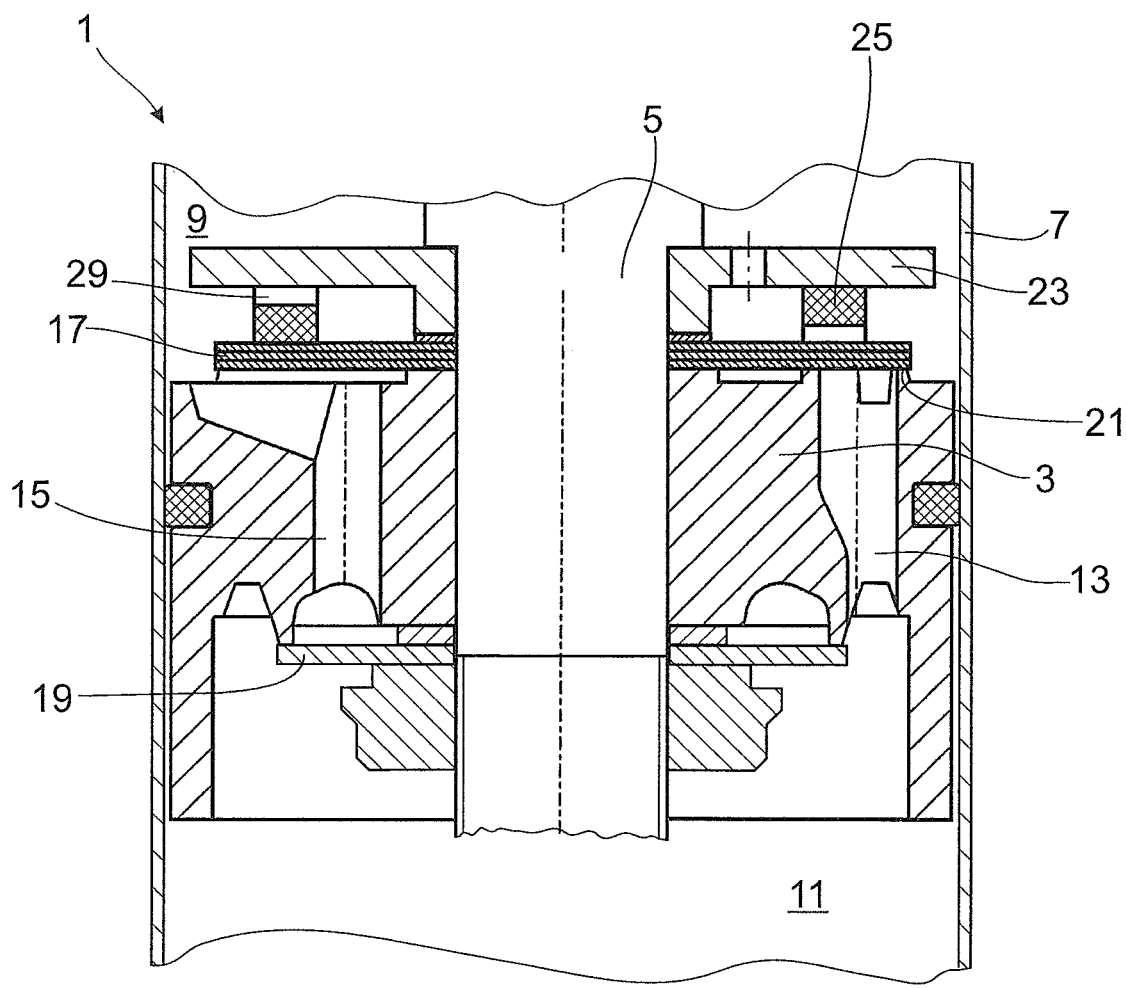
FIG. 1 is a damping valve in a sectional view.

FIG. 1 shows a damping valve 1 for a vibration damper of any constructional type. Damping valve 1 comprises a damping valve body 3, which is fastened to a piston rod 5. The invention is not limited to an embodiment form of this type and can be used, e.g., in a bottom valve or also within the framework of an adjustable damping valve.

Damping valve body 3 divides a cylinder 7 of the vibration damper into a working chamber 9 on the piston rod side and a working chamber 11 remote of the piston rod 5. Both working chambers 9; 11 are filled with damping medium. Through-channels 13; 15, each for a flow direction, are formed on different pitch circles in damping valve body 3. The configuration of the through-channels is to be considered as exemplary only. An outlet side of through-channels 13; 15 is at least partially covered by at least one valve disk 17; 19.

When there is an incident flow against valve disk 17 proceeding from the working chamber 11 remote of the piston rod 5, valve disk 17 lifts from its valve seat surface 21. The lift movement is controlled or braked in a damping manner by a supporting disk 23 in combination with an elastomer intermediate layer 25. As is illustrated by FIGS. 2 and 3 viewed in conjunction, the elastomer intermediate layer 25 has a plurality of raised deformation areas 27 in direction of valve disk 17 and/or supporting disk 23.

In principle, the elastomer intermediate layer 25 can be fastened to supporting disk 23 or valve disk 17. Flow-off channels 29 result between the raised deformation areas and allow the damping medium enclosed between elastomer intermediate layer 25 and piston rod 5 to flow off during a deformation of elastomer intermediate layer 25.

Figure 2:
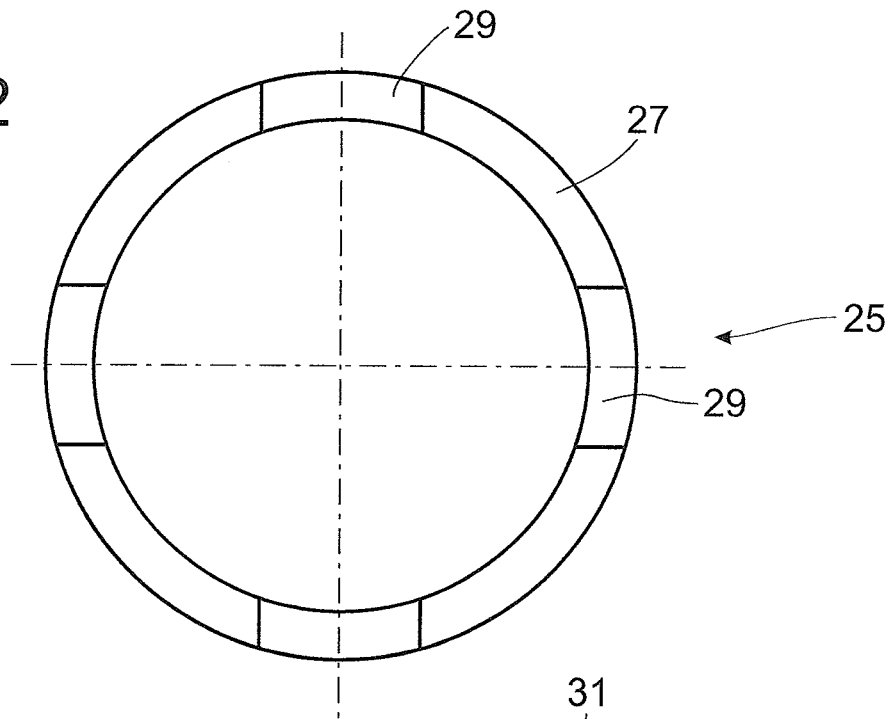
FIGS. 2-3 are views of the elastomer intermediate layer of FIG. 1.
Figure 3:
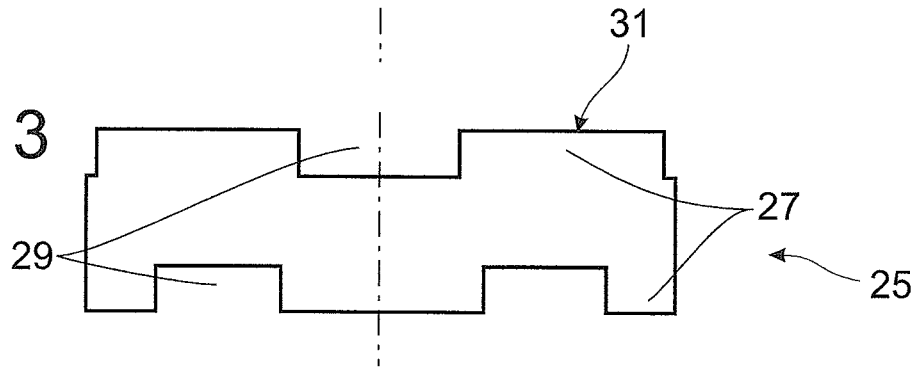

In the construction according to FIGS. 1 to 3, deformation areas 27 with the greatest elevation are formed with plane surfaces 31 at the end sides and are consequently very well suited as contact surfaces for valve disk 17 or for supporting disk 23. In addition, deformation areas 27 are formed at both front faces so that there is no need to adhere to a direction-dependent installation position of elastomer intermediate layer 25.

Figure 4:
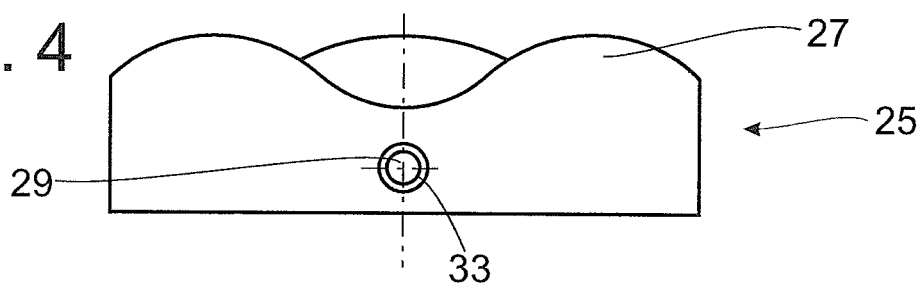
FIG. 4 is an elastomer intermediate layer with flow-off channel with sleeve.

It will be seen from FIG. 4 that the flow-off channel 29 can also be configured independently from the configuration of deformation areas 27. In this variant, the flow-off channel 29 comprises a radial opening, which is reinforced by a rigid sleeve 33 so that the flow-off channel 29 cannot be closed during an axial loading and resulting deformation.

Figure 5:
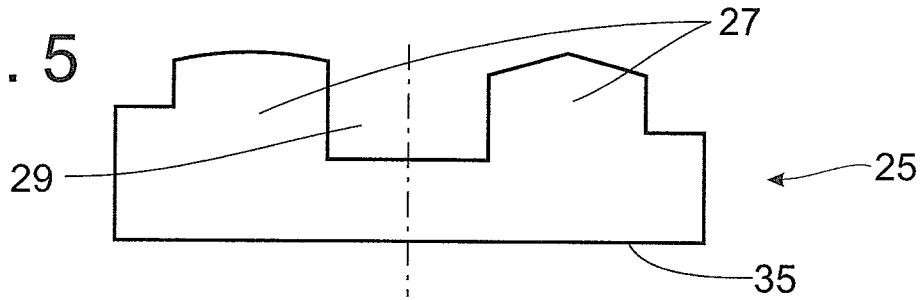
FIG. 5 is an elastomer intermediate layer with different spring deflections.

FIG. 5 serves to show the possibility of deformation areas 27 with different spring deflections. As can easily be seen, the deformation area 27 on the right-hand side has a greater distance from the opposite front face 35 than the deformation area on the left-hand side.

Figure 6:
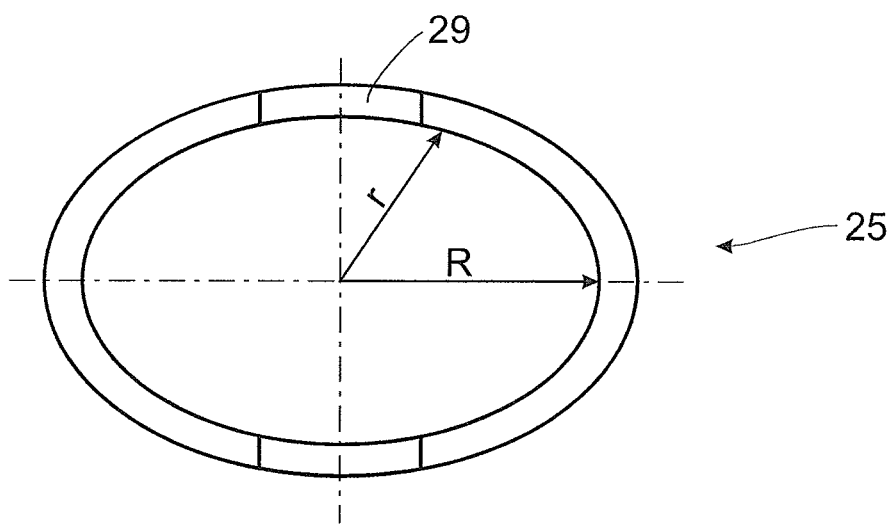
FIGS. 6-7 are an elastomer intermediate layer with elliptical base area.
Figure 7:
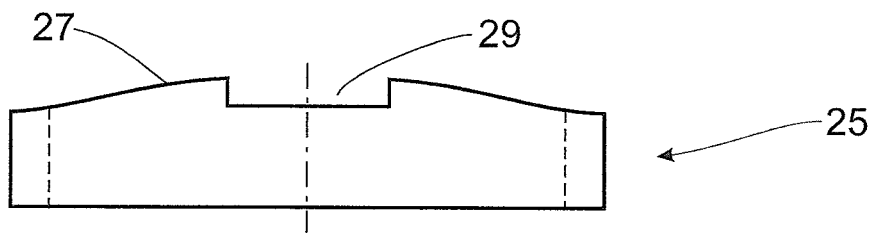

FIGS. 6 and 7 show an elastomer intermediate layer 25 with a corrugated deformation area 27. Further, elastomer intermediate layer 25 with its exemplary elliptical base area has a nonuniform radius in order to focus the onset of the lift movement of valve disk 17 on a determined circumferential area.

Figure 8:
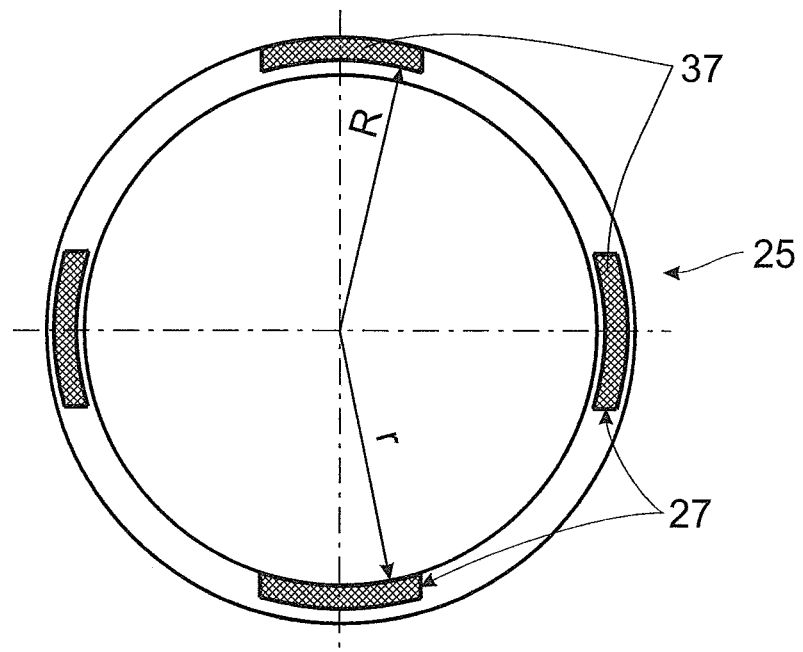
FIG. 8 is a variation of FIGS. 6 and 7.

The same functional goal is achieved in FIG. 8. Elastomer intermediate layer 25 has a constant diameter within the scope of manufacturing accuracy, but front faces of the deformation areas 27 have a varying distance R; r from the center axis of elastomer intermediate layer 25.

Figure 9:
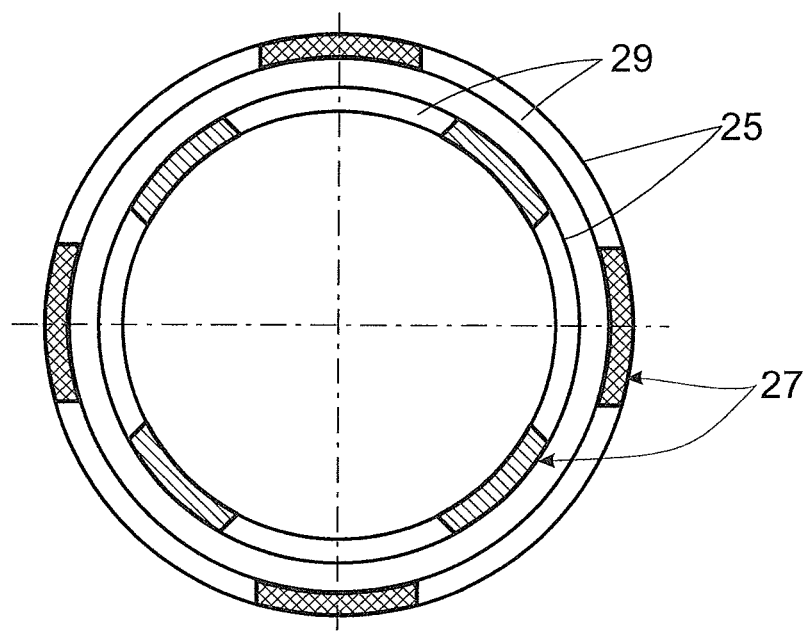
FIGS. 9-10 are a combination of a plurality of elastomer intermediate layers.
Figure 10:
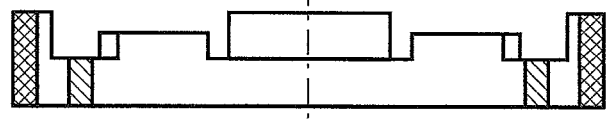

FIGS. 9 and 10 show the use of two elastomer intermediate layers 25 arranged coaxially. In this constructional form, all of the features of FIGS. 1 to 8 can be used. A multitude of operating characteristics can be achieved by way of this arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve for a vibration damper, comprising:
   at least one valve disk;
   a valve seat surface;
   a damping valve body with at least one through-channel, an outlet side of which is at least partially covered by the at least one valve disk, wherein the at least one valve disk lifts from the valve seat surface when there is an incident flow via the at least one through-channel;
   a supporting disk, configured as a stop and that limits a lift movement of at least one valve disk; and
   an elastomer intermediate layer arranged between the supporting disk and the at least one valve disk, the elastomer intermediate layer is formed by an elastomer ring which has at least one raised deformation area in direction of at least one valve disk and/or the supporting disk,
   wherein at least two raised deformation areas each have different spring deflections.

2. The damping valve according to claim 1, wherein the elastomer intermediate layer is fastened to the supporting disk.

3. The damping valve according to claim 1, wherein the elastomer intermediate layer is fastened to the at least one valve disk.

4. The damping valve according to claim 1, wherein the elastomer intermediate layer has a nonuniform radius.

5. The damping valve according to claim 1, wherein front faces of respective deformation areas have a varying distance from a center axis.

6. The damping valve according to claim 5, wherein respective deformation areas are formed at respective front faces of the elastomer intermediate layer.

7. The damping valve according to claim 1, wherein a plurality of elastomer intermediate layers are arranged coaxial to one another.

8. A damping valve for a vibration damper, comprising:
   at least one valve disk;
   a valve seat surface;
   a damping valve body with at least one through-channel, an outlet side of which is at least partially covered by the at least one valve disk, wherein the at least one valve disk lifts from the valve seat surface when there is an incident flow via the at least one through-channel;
   a supporting disk, configured as a stop and that limits a lift movement of at least one valve disk; and
   an elastomer intermediate layer arranged between the supporting disk and the at least one valve disk, the elastomer intermediate layer is formed by an elastomer ring which has at least one raised deformation area in direction of at least one valve disk and/or the supporting disk,
   wherein the elastomer intermediate layer has at least one radial flow-off channel.

9. The damping valve according to claim 8, wherein the at least one flow-off channel is reinforced by at least one rigid sleeve.

10. A damping valve for a vibration damper, comprising:
at least one valve disk;
a valve seat surface;
a damping valve body with at least one through-channel, an outlet side of which is at least partially covered by the at least one valve disk, wherein the at least one valve disk lifts from the valve seat surface when there is an incident flow via the at least one through-channel;
a supporting disk, configured as a stop and that limits a lift movement of at least one valve disk; and
an elastomer intermediate layer arranged between the supporting disk and the at least one valve disk, the elastomer intermediate layer is formed by an elastomer ring which has at least one raised deformation area in direction of at least one valve disk and/or the supporting disk,
wherein respective deformation areas with a largest elevation are constructed as plane surfaces.

\* \* \* \* \*